No. 12,067. Reissued Dec. 23, 1902.

J. P. WIENS.

BRUSH.

(Application filed Mar. 13, 1902.)

Witnesses.

C. A. Keeney.

Alma Klug.

Inventor.

John P. Wiens

By Benedict & Morsell

Attorneys.

UNITED STATES PATENT OFFICE.

JOHN P. WIENS, OF MILWAUKEE, WISCONSIN.

BRUSH.

SPECIFICATION forming part of Reissued Letters Patent No. 12,067, dated December 23, 1902.

Original No. 650,577, dated May 29, 1900. Application for reissue filed March 13, 1902. Serial No. 98,110.

*To all whom it may concern.*

Be it known that I, JOHN P. WIENS, of Milwaukee, Wisconsin, have invented a new and useful Improvement in Brushes, of which the following is a description, reference being had to the accompanying drawings, which are a part of this specification.

My invention relates to that class of brushes in which a series of absorbent tufts are bordered by non-absorbent tufts, it being customary to make the absorbent tufts from palma fiber and the non-absorbent tufts from tampico fiber, both of these fibers being materials of common knowledge to brush-makers. Brushes of this kind are utilized with a more or less volatile oil, such as kerosene or gasolene, applied to the absorbent tufts in sufficient quantity to saturate the same.

Heretofore in the class of brushes above set forth it has been necessary from time to time to pour the kerosene or gasolene or other volatile oil upon the absorbent tufts to saturate the same. This is open to objection, inasmuch as it is necessary under such arrangement to frequently inspect the brush in order to see that the proper amount of oil remains on the absorbent tufts, and it is also necessary, of course, to frequently pour a fresh supply of oil thereon.

It is the object of my invention to provide a construction wherein the kerosene or gasolene or other volatile oil is automatically fed from an oil-receptacle carried by the brush to the absorbent tufts, the said absorbent tufts being exposed to the supply of oil, while the non-absorbent bordering tufts are unexposed to the oil.

With the above primary object in view the invention consists in certain peculiarities in construction and combination of parts hereinafter particularly set forth with reference to the accompanying drawings and subsequently claimed.

Figure 1:
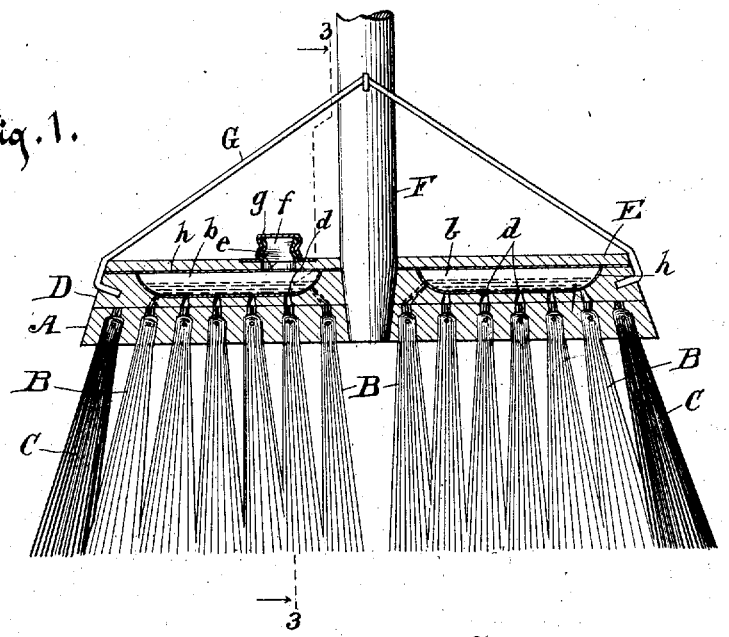
Figure 2:
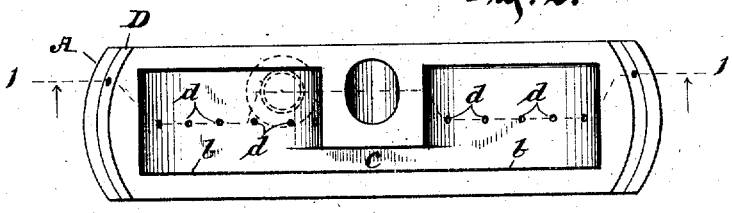
Figure 3:
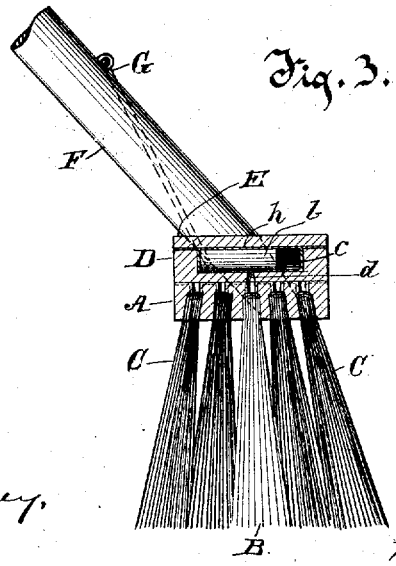

In the accompanying drawings, Figure 1 represents a vertical longitudinal section of my improved brush on the plane indicated by the line 1 1 of the succeeding figure. Fig. 2 is a plan view of the brush-back with the top thereof removed, and Fig. 3 is a transverse section of the brush on the line 3 3 of Fig. 1.

Referring by letter to the drawings, A indicates a back-section having a multiplicity of sockets in which tufts B C are wiredrawn, this operation being common practice in the art of brush-making, and while I show an all-wiredrawn brush it is within the scope of my invention to utilize a brush in which some, if not all, the tufts are otherwise secured in the sockets with which the back is provided, as is also common practice in said art. The tufts B of the brush are of palma fiber or other suitable absorbent material, and the tufts C are of tampico fiber, bristle, or other suitable non-absorbent material.

Made fast on the back-section A of the wiredrawn brush herein shown is another back-section D, hollowed out to form upper longitudinal recesses *b* in opposite directions from its center, and cut in the latter back-section is a channel *c*, connecting said recesses. For other than an all-wire drawn brush it is obvious that the back may be in one piece thick enough to provide for the recesses and their connecting-channel.

Perforations *d* in the bottom of the brush-back register with exposed butts of the absorbent tufts B. The perforations in the butts of the non-absorbent bordering tufts C, however, are not in register with the oil-supply, as clearly shown. The back of the brush may be provided with a cover E, that is made oil-tight thereon, and has a port *e*, through which oil is introduced to find its way to said tuft-butts when the brush is in working position, a suitable closure for the port being also provided. As herein shown, a flanged nozzle *f* is made fast in a countersink of the oil-port and provided with a screw-cap *g*, the latter serving as a closure that may be adjusted to regulate the gravity flow of the oil to the absorbent tufts of the brush in accordance with the amount of air admitted through said nozzle.

The brush-back and its cover E being preferably of wood, said cover is set on with oil-proof cement *h*, and wherever there is exposure of the wood to oil a coating of like cement is applied to render said wood impervious to the oil, it being especially desirable that the bottom of the hollowed-out portion of the brush-back should be so coated.

The covered brush-back is provided with a socket for a handle F, and a triangularly-bent wire stay G, connected to said back and the handle, serves as a fender for the brush.

In practice the oil supplied to the brush saturates the absorbent tufts of the same to moisten and lay the dust disturbed by said brush during a sweeping operation, and by utilizing a reservoir-back as part of said brush there is automatic feed of said oil, the latter being poured into the reservoir from time to time, as may be necessary, the feed being regulated according to conditions under which the aforesaid brush is employed. When not in use, the brush is placed so as to have its tufts uppermost, and the nozzle-cap is screwed tight to prevent escape of oil from the reservoir.

Having thus described my invention, what I claim as new, and desire to secure by Letters Patent, is—

1. A brush comprising absorbent tufts, and having a wooden back provided with upper recesses connected by a channel and also provided with bottom passages leading from the recesses to said tufts, a back-cover, oil-proof cement intermediate of the back and cover, similar cement applied to the recessed and channeled interior of said back, an oil-inlet in register with one of the back-recesses, and a closure for the inlet.

2. A brush comprising absorbent tufts and having a recessed wooden back provided with bottom passages leading from its recessed portion to said tufts, a back-cover, oil-proof cement intermediate of the back and cover, similar cement applied to the recessed portion of said back, an oil-inlet in register with said recessed portion of the aforesaid back, and a closure for the inlet.

3. A dustless sweeping-brush, comprising a back provided with an oil-receptacle, tufts of absorbent material secured in the back and having their inner ends exposed to the oil in the receptacle, non-absorbent tufts adjacent to the absorbent tufts, and having their inner ends secured to the back but non-exposed to the oil in the receptacle, whereby the oil is fed from the receptacle to the absorbent tufts only, and means for automatically feeding said oil from the receptacle to the absorbent tufts.

4. A dustless sweeping-brush comprising a back having an oil-recess therein, with apertures leading downwardly from the recess through the brush-back, tufts of absorbent material secured in the apertures and exposed to the oil in the recess, non-absorbent tufts adjacent to the absorbent tufts and having their inner ends secured to the back but non-exposed to the oil in the recess, whereby the oil is fed from the recess to the absorbent tufts only, and means for automatically feeding said oil from the recess to the absorbent tufts.

5. A dustless sweeping-brush having a recessed back, a coating for the bottom of said recess to render the same impervious to the passage of oil therethrough, absorbent and non-absorbent tufts secured to the back, the absorbent tufts being exposed at their inner ends to the oil in the recess, and the non-absorbent tufts unexposed at their inner ends to said oil in the recess, and means for automatically feeding the oil from the recess to the absorbent tufts only.

6. A dustless sweeping-brush having a recessed back, the bottom of said recess having a series of oil-passages leading therefrom, but the surface of said bottom of the recess being otherwise impervious to the passage of oil therethrough, absorbent and non-absorbent tufts secured to the back, the oil-passages extending from the oil-recesses leading only to the absorbent tufts, and the impervious character of the bottom of the oil-recess preventing any of the oil in said recess from passing from the recess to the non-absorbent tufts, and means for automatically feeding oil from the oil-recess through the oil-passages and to the absorbent tufts only.

In testimony whereof I affix my signature in presence of two witnesses.

JOHN P. WIENS.

Witnesses:
A. L. MORSELL,
ANNA V. FAUST.